May 24, 1955 M. M. BOURGEAUX 2,708,813

METHOD OF AND APPARATUS FOR PRODUCING GLASS FIBERS

Filed May 31, 1949 3 Sheets-Sheet 1

*INVENTOR*
MAURICE MARCEL BOURGEAUX

BY
*ATTORNEY*

May 24, 1955 M. M. BOURGEAUX 2,708,813
METHOD OF AND APPARATUS FOR PRODUCING GLASS FIBERS
Filed May 31, 1949 3 Sheets-Sheet 2
FIG. 5.
FIG. 7.
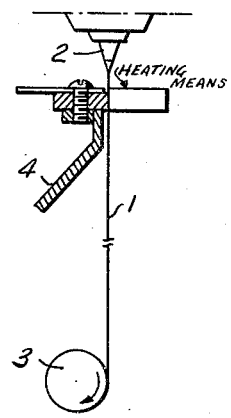
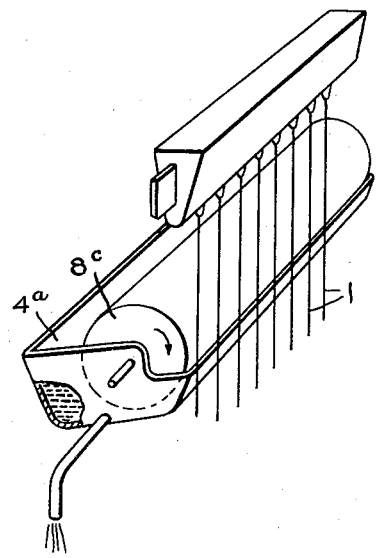
FIG. 6.
FIG. 4.
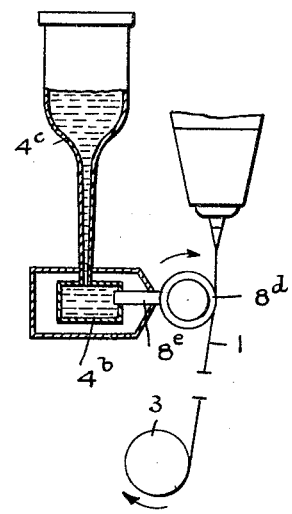
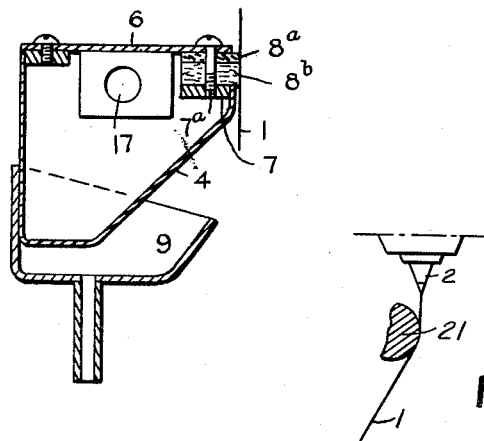
FIG. 8.
INVENTOR
MAURICE MARCEL BOURGEAUX
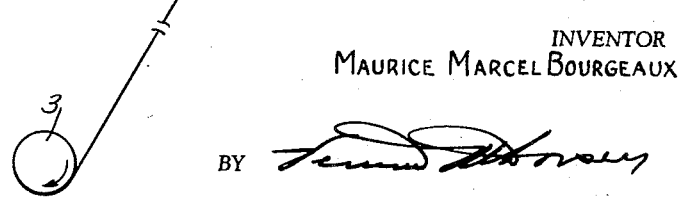
BY
ATTORNEY

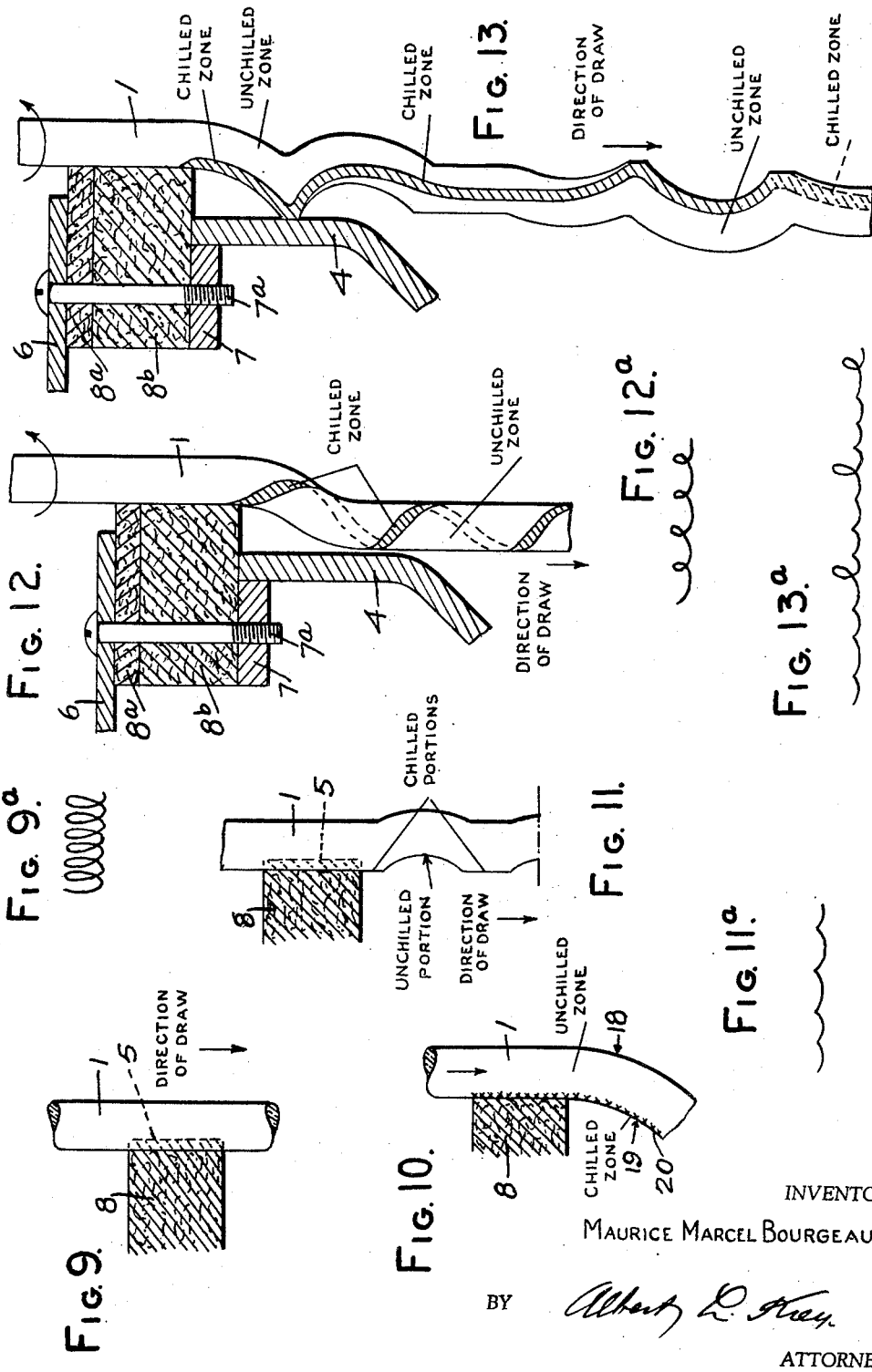

United States Patent Office 2,708,813
Patented May 24, 1955

2,708,813
METHOD OF AND APPARATUS FOR PRODUCING GLASS FIBERS

Maurice Marcel Bourgeaux, Paris, France, assignor to Societe Anonyme des Manufactures des Glaces & Produits Chimiques de Saint-Gobain, Chauny & Cirey, Paris, France Application May 31, 1949, Serial No. 96,363

Claims priority, application France June 1, 1948

17 Claims. (Cl. 49—17)

My invention relates to a curled or crimped or undulated glass fiber and to an apparatus and process for producing the same.

The present invention has for one of its objects a method for the manufacture of curled, crimped or undulated glass fibers which consists in submitting the molten glass streamlets, in the course of their drawing into fibers and in a zone where their temperature is above the lowest strain release temperature for the considered fibers, to a thermal treatment for the purpose of creating in the glass internal tensions which are distributed asymmetrically and produce deformations in the fiber.

The deformations of the fibers which are obtained by this method are regularly distributed along the fiber, that is to say that the shape given to the fibers presents simple or complex undulations having a period which may be maintained constant or which may be varied according to any desired predetermined law. These deformations may be substantially in the same plane or they may be situated in different planes with respect to one another.

The dissymmetrical tensions are developed in zones of the fiber which, in each cross-section, concern only a section or a part of the periphery of the fiber. These zones may extend along continuous lines over the whole length of the fiber either along its surface parallel to its axis or along any other line, for example a helical line. In other cases these zones may be distributed in a discontinuous manner along the fiber.

The method according to the present invention accords to the glass fibers a curled or crimped or undulated shape without reducing the mechanical properties of these fibers, and particularly their tensile strength.

The present invention involves more particularly the asymmetrical chilling of the fiber in the course of its drawing and while it is at a temperature at which internal strains can develop in the glass, whereby the resulting contraction of one side of the fiber will produce a curled or crinkled or undulated fiber.

The chilling action is exerted on a section or part only of the periphery of the fiber and it may be exerted on the fiber in the course of its formation either continuously or discontinuously.

When the chilling action is exerted continuously along a section of the surface of the fiber, the resulting fiber presents helical curls having a diameter substantially constant. The diameter of the curls depends from the physical properties of the glass, superficial tension, length of time during which the molten glass streamlets remain sufficiently fluid to permit the development of internal strains, and in particular the expansion coefficient. It depends also upon the value of the tensions developed, i. e. from the intensity of the rapid cooling or chilling effect.

The chilling action may also be applied on the fiber discontinuously according to any predetermined law. The zones or sections of the fiber submitted to the cooling action may be distributed along a section or part of the surface of the fiber and, in that case, the resulting fiber has an undulated shape with all the undulations substantially in the same plane. The zones submitted to the cooling action may be distributed along a helical line of the fiber and the resulting fiber has helical curls in which each curl may present a certain undulation.

According to the present invention the cooling action may be effected by causing the glass fiber in the course of its formation to pass adjacent a cooling surface which may be the metallic surface of a tube inwardly cooled by the circulation of a cooling medium or a surface of any appropriate material, polished metal, or porous substances such as, for example, porcelain, wood or felt, on which a liquid is caused to flow in the form of a film.

The asymmetrical cooling exerted on the fiber in the course of its formation according to the present invention may also be combined with a mechanical action to produce deformations of the fiber.

As the shape of the fiber results partly or wholly from the tensions created inside the fiber, the process does not limit in any way the possibilities of these deformations, and in particular it permits obtaining deformations in amplitudes and elongations much smaller than could be obtained by using mechanical means only. Deformations of different shapes and dimensions can be obtained by controlling the intensity of the chilling, the zone of the fiber on which it is applied and also by suitably choosing the nature of the glass, in particular its coefficient of expansion, and the temperature of the glass before chilling.

According to the present invention, it is also possible to reinforce the effect of the dissymmetrical cooling action on one side of the fiber, by exerting a heating action simultaneously on the other side of the fiber.

The curled or crimped or undulated fibers obtained according to the present invention have obvious advantages in the manufacture of woven or felted bodies.

They also can be used as a reinforcing material of numerous products, especially of a fibrous type, such as paper, their shape permitting a better intermixing of the fibers with the material to be reinforced. In the case of cement or other materials having no special affinity for glass fibers their particular shape insures a better adherence of the material to the glass fibers.

These fibers can be used in continuous form or can be cut at any desired length and used in the textile industry since they can be obtained at any desired fineness.

They can be used alone or mixed with other natural or artificial textile materials to constitute slivers, threads or fabrics.

Another object of the present invention is to provide a glass fiber helically curled which may be used advantageously for producing elastic insulating mats or in textile industry. The diameter of the helical curl may vary within large limits; in particular it is possible to obtain helical curls having diameters from 20 mm. or more to about 1 mm.

A still further object of the present invention is to provide an undulated or crinkled glass fiber in which the undulations either in a plane or in different planes have a wave length inferior to 15 mm. with amplitudes of approximately the order of half a wave length, particularly a glass fiber of a diameter inferior to 12 microns having 1 to 3 undulations per centimeter. Such fibers may be used advantageously for textile applications.

In the present instance, we use glass as a generic term for silicious material, capable of being drawn into fibers when in a sufficiently viscous condition resulting from its temperature.

The accompanying drawings show merely by way of examples, methods and apparatus for carrying out the present invention.

Referring to these drawings in which corresponding parts are designated by corresponding marks of reference, Figure 1 is a vertical section of an apparatus by which my process may be carried out to produce my improved product.

Figure 4 is a view of a part of a modified form of the apparatus shown in Figure 1.

Figure 5 is a perspective fragmental view of another apparatus embodying my invention.

Figure 6 is a diagrammatic view of still another form.

Fig. 7 illustrates diagrammatically a reheating of one side of the fibers.

Fig. 8 illustrates diagrammatically a bending of the fiber out of axial alignment with the spinnerette occasioned by a displacement of the drawing drum.

Fig. 9 illustrates diagrammatically the manner of continuously chilling one side or zone of the fiber.

Fig. 9a illustrates diagrammatically the relaxed fiber resulting from the procedure of Fig. 9.

Fig. 10 is a diagrammatic view illustrating the tendency of the fiber to curl due to the chilling action and assuming that no tractive force is present or applied to the fiber.

Fig. 11 is a diagrammatic view illustrating the manner of producing an intermittent or discontinuous chilling of one side or zone of the fiber.

Fig. 11a illustrates diagrammatically the relaxed fiber resulting from the procedure of Fig. 11.

Fig. 12 is a diagrammatic view illustrating the manner of producing a fiber chilled on a helical line utilizing the arrangement shown in Fig. 4.

Fig. 12a illustrates diagrammatically the relaxed fiber resulting from the procedure of Fig. 12.

Fig. 13 is a diagrammatic view illustrating the manner of producing a fiber embodying helical curls and undulations utilizing the arrangement shown in Fig. 4.

Fig. 13a illustrates diagrammatically the relaxed fiber resulting from the procedure of Fig. 13.

Figure 1:
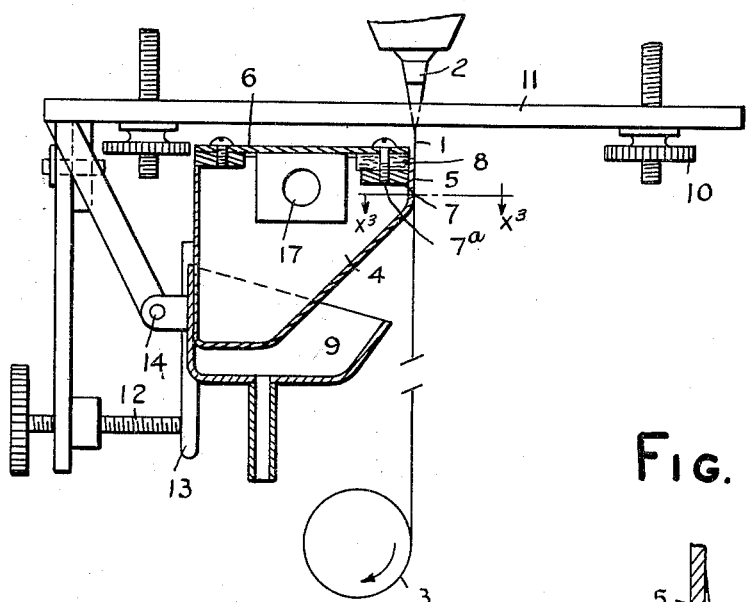
Figure 2:
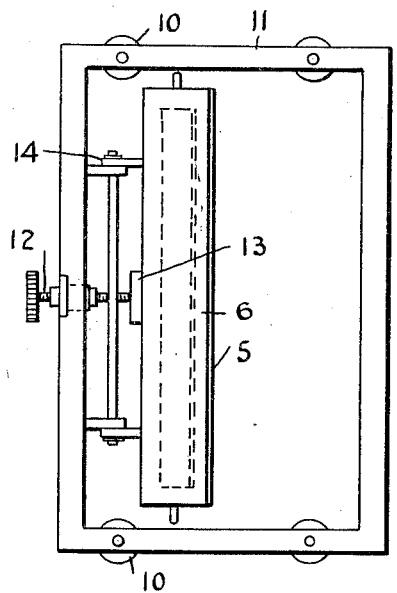
Figure 2 is a plan view of the apparatus shown in Figure 1.

In the above diagrammatic views it will be understood that the structure and fibers have been greatly exaggerated for clarity of illustration and obviously do not include scale dimensions.

The filament 1 may be formed in any convenient manner, e. g., by being drawn downwardly from glass issuing in a cone from one of a series of spinnerettes, fed with molten glass, by means of a drum 3. To apply my invention to the fiber so formed I cause the fibers in the course of their drawing and still while at a temperature above the lowest strain release temperature for the considered fiber to pass adjacent to a wetted or filmed surface and in contact with the liquid film thereon. This film 5 may be caused by permitting a cooling liquid to issue through a porous body or diaphragm 8 forming the upper portion of the front wall of a trough 4 containing a suitable liquid such as for example water and the pressure within which is regulated by a controllable escape pipe 17. If the porous body is compressible the amount of the liquid escaping to provide the film may be regulated by the pressure exerted on the diaphragm by adjusting the plate 7 towards the top 6 of the trough by the screw 7a.

Below the trough is a tray 9 to receive the liquid flowing down from the front face of the trough.

The trough is pivoted at 14 in a frame 11 vertically adjustable in respect to the spinnerettes by screws 10 and may be moved laterally in respect to the vertical plane containing the spinnerettes by the screw 12 bearing against the arm 13 fastened to the trough.

Figure 3:
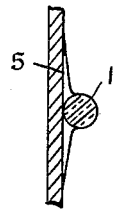
Figure 3 is an enlarged horizontal section on line X-3—X-3 of Figure 1.

With the trough properly adjusted, that is to say, with the surface of the liquid film on its front face of the diaphragm in the line of draw of the descending fibers the latter will be wetted thereby on one side as shown in Figure 3. This side will therefore be chilled in respect to the other side and be thereby tempered and will contract axially producing a fiber which will tend to curl when set.

When a cooling surface of adequate length is used, the glass fibers are practically congealed by the time they leave such surface.

Under the conditions just described, the cooling or chilling action of the fluid film 5 on the block 8 is exerted on the fibers substantially in a limited section or band extending along one side or zone of the fibers parallel to the axes of the fibers and continuously along their surfaces. In order to obtain the continuous chilling the outer surface of trough 4, Fig. 1, or the outer surface of the block 8a, 8b, Fig. 4, and its fluid film is placed parallel to the row of orifices in the bushing so as to contact with one side of the fibers as they are drawn vertically from the orifices in the bushing or spinnerettes, see also Figs. 3 and 9. The cooling block is placed at a distance depending, for a given value of the curl to be imparted to the fiber, upon the speed of drawing of the fiber and the temperature in the bushing. The chilling surface has a length sufficient to permit the glass fibers to be practically congealed when they leave the surface of the block. This block is fed with cold water, and the thickness of the water film will be sufficient for the proper chilling of the fiber in the desired zone, so that the steam formed by its contact with the fiber will not prevent, even for an instant, the chilling of the fiber. Under the circumstances above described the fiber will be chilled continuously along a side or zone parallel to the axis of the fiber. The chilled fiber so produced, when relaxed or removed from the drum, will take the shape diagrammatically illustrated in Fig. 9a.

The curling of the fiber as indicated in Fig. 9a, due to the unbalanced state of the fiber because of presence of the chilled and unchilled zones, can be appreciated by reference to Fig. 10. In this figure it is assumed that the fiber can pass downwardly along the chilling surface and its fluid film 5 without any tension or drawing force applied to it. Under this assumed but impractical procedure, the fiber cooled only on one side would have a tendency to curve in the plane containing the axis of the fiber and the cooled surface of the fiber and a curl would be obtained in this plane. It will be observed that the congealing of the glass structure at a high temperature, obtained by causing one side of the fiber to pass in the chilling medium, must produce, in the chilled zone or section, a glass structure of smaller density than if the same section were annealed. Thus, the specific volume of the glass at the chilled section being greater than the specific volume of the glass on the section or zone which has not been chilled, the surface of the fiber which has been submitted to the chilling action is on the smaller radius of the curve or curl and is consequently on the concave part of said curve or curl. This is shown diagrammatically in Fig. 10 where the chilling surface with its chilling fluid is shown in contact with the fiber 1 moving from its spinnerette in the direction of the arrow. The convex part of said curl or curve is indicated at 18 and the concave part of the curve or curl is indicated at 19 and the portion of the fiber chilled is shown approximately by the cross-hatching at 20.

However, the formation of this curve or curl as shown in Fig. 10 is impossible, due to the traction drawing of the fiber, and it is obliged to remain straight. Under drawing conditions, the fiber is tight and has a portion or section of its surface and the internal glass immediately next thereto in a state of compression while the remaining sections and surface of the fiber is in a state of tension. Under a treatment of the kind described the fiber is in an unbalanced state and the surface of the fiber which has the largest dimension can only extend or find its position, as a result of the forces existing in the fiber, by winding around other surfaces of the fiber having smaller dimensions when the fiber is ultimately relaxed, thus producing the curl shown in Fig. 9a.

By properly adjusting the feeding and the position of the cooling liquid film with respect to the orifices 2, the liquid may be vaporized by its contact with the fiber and the fiber may be caused to vibrate or chatter, this being due to the entrapped steam between it and the face of the diaphragm. As the drawing is effected at a great speed, the steam formed by its contact with the fiber cannot escape instantaneously and it prevents the abrupt cooling of the fiber during a short instant, but as it escapes on the continued movement of the fiber it permits the latter to move back into contact with the liquid film whereby the fiber instead of being continuously chilled on one side is intermittently chilled at intervals thus producing a crinkled fiber. This intermittent chilling of the fiber is shown diagrammatically in Fig. 11 and can be readily accomplished by utilizing a chilling block having a suitable length and thickness of the water film. The intermittent chilling just described will produce a fiber, when relaxed or removed from the drum, having the shape generally indicated in Fig. 11a.

It has been stated that the fibers may be chilled in zones extending along helical lines. This procedure is diagrammatically depicted in Fig. 12 where the fiber is under tension occasioned by the rotation of the drawing drum. Here the effective chilling length of the and the thickness of the water or chilling fluid approximates that of Fig. 9. The effective chilling length of the block should terminate in such a manner as to permit the fiber to rotate upon itself or exercise a tendency to kink. This may be accomplished by utilizing the structure of Fig. 4 where the porous block 8a, 8b, extends outwardly beyond the front wall of the trough 4 for chilling contact with the fiber, thus providing a recess or pocket in which the fiber is free to twist or kink as shown in Fig. 12. Since the fiber is in an unbalanced state due to the existence of the chilled and unchilled zones, the surface of the fiber which has the largest dimension can only extend or find its position by winding around the surface of the fiber having the smaller dimension with the result that the fiber actually twists or rotates upon itself during the drawing operation along a helicoidal line as shown in Fig. 12. The direction of rotation or twist of the fiber is suggested by the curved arrow in this figure. The fiber produced in the manner just described, when relaxed or removed from the drum, will take the shape diagrammatically shown in Fig. 12a.

It has been stated that fibers may be submitted to a chilling action along the helical line of the fiber in such a manner that the resulting fiber has helical curls in which each curl may present undulations. The manner in which a fiber having these characteristics is produced is indicated diagrammatically in Fig. 13 where a cooling block 8a, 8b, similar to the cooling block of Fig. 12 may be employed. The thickness of the chilling fluid of Fig. 13 is such that the liquid may be vaporized by its contact with the fiber and the fiber caused to vibrate or chatter due to the entrapped steam between the fiber and the face of the block 8 in the manner described in connection with Fig. 11. The localized chilling of a section or zone of the fiber causes the fiber to rotate or twist upon itself in the manner described in connection with Fig. 12, but such rotation is not as severe or pronounced as in the case of Fig. 12 since the chilled zone extending along the fiber is intermittent and not continuous. The fiber produced by the procedure just explained, when relaxed or removed from the drum, contains the helical curls and undulations as shown in Fig. 13a.

The amount of curl or crinkle so produced may be regulated by the selection of the liquid forming the film, the time the fiber is in contact with the film, the speed of draw of the fiber and the composition thereof. The liquid should be selected from those having high thermal conductivity, high specific heat and high latent heat of vaporization. The higher these factors the more abrupt and severe will be the local tempering.

In Figure 4 the porous wall or diaphragm instead of being of uniform substance throughout consists of two parts 8a and 8b of different porosity. It is thus possible to obtain a more precise regulation of the thickness of the liquid film and of the cooling effect.

In Figure 5 I have illustrated a form of my invention in which instead of the film being on a vertical surface through which the liquid extrudes it is formed on the surface of a rotating roller 8c partly immersed in a trough 4a containing a liquid by which its surface is wetted to form the liquid film. The trough 4a is mounted in the frame 11 as is the trough 4 of Figure 1.

In Figure 6 the roller 8d instead of rotating in a trough is wetted by contacting with a wick 8e entering a liquid containing chest 4b fed by liquid from the reservoir 4c. The parts here stated may be all carried as is the trough 4.

The rollers 8c and 8d may be cooled by an internal refrigerant and the films thereon may be of liquids having low freezing temperatures such as glycerin.

The drawing roller 3 may be disposed so that the fibers will not only be tangent to roller 8d but they will be in contact with said roller over a part of its periphery so that this roller may exert on the fibers a complementary mechanical shaping action.

The mechanical shaping just described is diagrammatically illustrated in Fig. 8 where the cooling element in its various forms is provided with a curved surface, the relative disposition of the spinnerettes 2, element 8 and drawing drum 3 being such as to cause a bending of the fiber upon the surface of the element 21 as shown in this figure.

In Fig. 7 there is diagrammatically shown means and the method of chilling one section or zone of the fiber and heating the opposite portions of the fiber as heretofore explained. One side of the fiber is shown as being chilled by the means employed in Figs. 1 and 4 and the opposite side of the fiber is heated at a point opposite the point of chilling by suitable heating means as indicated in the drawing.

The surface of the rollers of Figures 5 and 6 may be provided with grooves, in particular longitudinal grooves, in order that the cooling action be exerted intermittently on the fiber.

I claim:

1. A method for the manufacture of curled or undulated glass fibers which comprises mechanically drawing fine fibers from molten thermoplastic material, submitting the fibers in the course of their formation and in a plastic state suitable for their deformation, to a differential thermal treatment localized on only one side of said fibers creating internal tensions in each fiber.

2. A method for the manufacture of curled or undulated glass fibers which comprises mechanically drawing fine fibers from molten thermoplastic material, submitting the fibers in the course of their formation and in a plastic state suitable for their deformation, to a differential thermal treatment localized on only one side of said fibers exerted immediately below the attenuation cone on a limited and short length of the fiber, thus developing in the fibers asymmetrically distributed internal properties.

3. A method for the manufacture of curled or undulated glass fibers which comprises mechanically drawing fine fibers from molten thermoplastic material, submitting the fibers in the course of their formation and in a plastic state suitable for their deformation, to a chilling action localized on one side of the fibers and exerted immediately below the attenuation cone on a limited and short length of each fiber creating internal tensions in the fibers.

4. A method for the manufacture of curled or undulated glass fibers which comprises mechanically drawing fine fibers from molten thermoplastic material, submitting the fibers in the course of their formation and in a plastic state suitable for their deformation, to a transversely asymmetrical chilling action exerted immediately below the attenuation cone on a limited and short length of the fiber creating internal tensions in the fiber, said chilling action being exerted continuously on the whole length of the fiber.

5. A method for the manufacture of curled or undulated glass fibers which comprises mechanically drawing fine fibers from molten thermoplastic material, submitting the fibers in the course of their formation and in a plastic state suitable for their deformation, to a chilling action localized on only one side of the individual fiber and exerted immediately below the attenuation cone on a limited and short length of the fiber creating internal tensions in the fiber, said chilling action being exerted discontinuously over the whole length of the fiber.

6. A method for the manufacture of curled or undulated glass fibers which comprises submitting the fibers, in the course of their formation and while in a plastic state suitable for their deformation, to a chilling action localized along a helical line on the fiber creating internal tensions in the fiber.

7. A method for the manufacture of curled or undulated glass fibers which comprises causing the fibers, in the course of their formation and while in a plastic state suitable for their deformation, to come into contact by one side only with a liquid film so as to exert a chilling action on only a portion of their periphery.

8. A method for the manufacture of curled or undulated glass fibers which comprises causing the fibers, in the course of their formation and while in a plastic state suitable for their deformation, to come into contact on one side only with a cooled surface so as to exert on only a portion of the periphery of the fibers an energetic chilling action.

9. A method for the manufacture of curled or undulated glass fibers which comprises causing the fibers, in the course of their formation and while in a plastic state suitable for their deformation, to come into contact on one side only with a water film.

10. A method for the manufacture of curled or undulated glass fibers which comprises submitting the fibers, in the course of their formation and while in a plastic state suitable for their deformation, to a chilling action localized on only one side of the fiber and to a simultaneous shaping action by contact with a shaping surface.

11. A method for the manufacture of curled or undulated glass fibers which comprises submitting the fibers, in the course of their formation and while in a plastic state suitable for their deformation, to a cooling action localized on only a portion of the periphery of the fibers and to a reheating action exerted on the opposite side of said fibers.

12. A method for the manufacture of curled or undulated glass fibers which comprises mechanically drawing fine fibers from thermoplastic material, submitting the fibers in the course of their formation and in a plastic state suitable for their deformation to a differential thermal treatment localized on only one side of these fibers and developing in the fibers asymmetrically distributed internal properties continuously over the whole length of the fiber.

13. In an apparatus for the manufacture of curled or undulated glass fibers, the combination of spinnerettes from which the molten glass issues, means for drawing the fibers as formed and a cooling surface located adjacent the spinnerette and at a point where the fiber is still plastic and in contact with a portion only of the periphery of each fiber and exerting a chilling action on said portion thereby creating internal tensions in each fiber.

14. In an apparatus for the manufacture of curled or undulated glass fibers, the combination of spinnerettes from which the molten glass issues, a drum for drawing the fibers as formed and a cooled element located between said spinnerettes and said drum with its periphery and in contact with a portion only of the periphery of each of the fibers.

15. In an apparatus for the manufacture of curled or undulated glass fibers, the combination of spinnerettes from which the molten glass issues, a rotating drum for drawing the fibers and a surface covered by a thin layer of liquid film located adjacent the spinnerettes and at a point where the fibers are still plastic, said film and surface occupying a position of contact with one side only of the fiber.

16. In an apparatus for the manufacture of curled or undulated glass fibers, the combination of spinnerettes from which the molten glass issues in fiber form, a drum drawing and receiving the fibers and a cooling and shaping element provided with a curved surface located between the spinnerettes and the drum in position to contact with a portion only of the surface of the fibers at a point where the fibers are still plastic and thereby chill said portion and about which said fiber is partially turned in its travel toward the drum.

17. In an apparatus for the manufacture of curled or undulated glass fibers, the combination of spinnerettes from which the molten glass issues in fiber form, a drum for drawing and receiving the fibers and a cooling surface located between said spinnerettes and drum for chilling contact only with a portion of the periphery of the fibers at a point where the fibers are still plastic and heating means located at opposite sides of the fibers thereby augmenting the strain characteristics of the fiber induced by said cooling surface.

References Cited in the file of this patent

UNITED STATES PATENTS

| | | |
|---|---|---|
| 2,189,822 | Thomas et al. | Feb. 13, 1940 |
| 2,255,236 | Willis | Sept. 9, 1941 |
| 2,289,774 | Graves | July 14, 1942 |
| 2,313,296 | Lamesch | Mar. 9, 1943 |
| 2,313,630 | Dockerty | Mar. 9, 1943 |
| 2,348,182 | Slayter | May 2, 1944 |
| 2,353,887 | Fletcher | July 18, 1944 |
| 2,386,158 | Collins | Oct. 2, 1945 |
| 2,405,036 | Hoffman | July 30, 1946 |
| 2,407,456 | Simison et al. | Sept. 10, 1946 |
| 2,448,499 | Swann | Aug. 31, 1948 |
| 2,481,543 | Stalego | Sept. 13, 1949 |